United States Patent
Rodabaugh

(10) Patent No.: US 9,738,208 B2
(45) Date of Patent: Aug. 22, 2017

(54) SLIDE-OUT FOR RECREATIONAL VEHICLES

(71) Applicant: OPP XL B.V., Nieuw Lekkerland (NL)

(72) Inventor: Daniel K. Rodabaugh, Elkhart, IN (US)

(73) Assignee: OPP XL B.V., Nieuw Lekkerland (NL)

(*) Notice: Subject to any disclaimer, the term of this patent is extended or adjusted under 35 U.S.C. 154(b) by 0 days.

(21) Appl. No.: 14/545,162

(22) Filed: Mar. 31, 2015

(65) Prior Publication Data
US 2016/0288689 A1 Oct. 6, 2016

(51) Int. Cl.
*B60P 3/34* (2006.01)

(52) U.S. Cl.
CPC ...................... *B60P 3/34* (2013.01)

(58) Field of Classification Search
CPC ........ B60P 3/34; B60P 3/343; B65H 2220/01; B25B 23/0021; B25B 23/0035; B25G 3/26; B60N 3/102; Y10S 224/926; B60J 3/0282
USPC ...... 296/26.01, 171, 175, 26.12, 26.13, 165, 296/26.09
See application file for complete search history.

(56) References Cited

U.S. PATENT DOCUMENTS

| | | | |
|---|---|---|---|
| 4,500,132 A | 2/1985 | Yoder | |
| 5,332,276 A * | 7/1994 | Blodgett, Jr. | B60P 3/34 296/171 |
| 5,570,924 A * | 11/1996 | Few | B60P 3/34 296/171 |
| 5,634,683 A | 6/1997 | Young | |
| 5,902,001 A * | 5/1999 | Schneider | B60P 3/34 296/171 |
| 6,286,883 B1 | 9/2001 | Schneider | |
| 6,338,523 B1 * | 1/2002 | Rasmussen | B60P 3/34 296/175 |
| 6,415,675 B1 * | 7/2002 | Schneider | B62D 33/08 188/69 |
| 6,428,073 B1 * | 8/2002 | Blodgett, Jr. | B60P 3/34 296/171 |
| 6,471,275 B1 * | 10/2002 | Kunz | B60P 3/34 296/171 |
| 6,702,353 B1 * | 3/2004 | Blodgett, Jr. | B60P 3/34 296/26.01 |
| 7,300,086 B2 | 11/2007 | MacLean | |
| 7,370,900 B1 | 5/2008 | Blodgett, Jr. | |
| 7,540,116 B1 * | 6/2009 | Martinson | B60P 3/34 277/644 |
| 8,091,940 B1 | 1/2012 | Buls et al. | |
| 9,033,390 B1 * | 5/2015 | Ksiezopolski | B60R 13/06 296/26.13 |

(Continued)

FOREIGN PATENT DOCUMENTS

| | | |
|---|---|---|
| CA | 2562326 | 4/2007 |
| WO | WO 2014/115181 | 7/2014 |

OTHER PUBLICATIONS

International Search Report and Written Opinion issued in Int'l Pat. Appl. No. PCT/NL2016/050224 dated Aug. 23, 2016.

*Primary Examiner* — Kiran B Patel
(74) *Attorney, Agent, or Firm* — Barnes & Thornburg LLP

(57) ABSTRACT

A slide-out system for recreational vehicles is provided which uses an outer wall which closes flush with the outer wall of the vehicles, radiussed corners about the slide-out periphery, a continuous peripheral seal, a drive mechanism mounted in the slide-out portion rather than on the vehicle, and a drive shaft weather seal.

7 Claims, 5 Drawing Sheets

(56) References Cited

U.S. PATENT DOCUMENTS

| | | | | |
|---|---|---|---|---|
| 2002/0047286 A1* | 4/2002 | Nye | ............................ | B60P 3/34 296/26.13 |
| 2002/0060467 A1* | 5/2002 | McManus | .................. | B60P 3/34 296/26.01 |
| 2002/0171255 A1* | 11/2002 | Eichhorn | ................... | B60P 3/34 296/26.01 |
| 2004/0066060 A1* | 4/2004 | Rasmussen | ................ | B60P 3/34 296/165 |
| 2004/0174031 A1* | 9/2004 | Rasmussen | ................ | B60P 3/34 296/26.01 |
| 2005/0179278 A1* | 8/2005 | Yoder | ........................ | B60P 3/34 296/26.13 |
| 2006/0197358 A1* | 9/2006 | Franzini | ..................... | B60P 3/34 296/156 |
| 2007/0063525 A1* | 3/2007 | Howells | ..................... | B60P 3/34 296/24.3 |
| 2007/0194587 A1* | 8/2007 | Wolf | ......................... | B60P 3/34 296/26.13 |
| 2008/0048464 A1* | 2/2008 | Ksiezopolski | ............ | B60P 3/34 296/26.01 |
| 2008/0073925 A1* | 3/2008 | Ksiezopolski | ............ | B60P 3/34 296/26.01 |
| 2008/0100003 A1* | 5/2008 | Vance | ................... | F16J 15/3288 277/553 |
| 2008/0116707 A1* | 5/2008 | Boaz | .......................... | B60P 3/34 296/26.01 |
| 2008/0315607 A1* | 12/2008 | Herson | ..................... | B60P 3/34 296/26.13 |
| 2011/0025091 A1* | 2/2011 | Schwindaman | ........... | B60P 3/34 296/171 |
| 2012/0035813 A1 | 2/2012 | Kreil | | |
| 2012/0261944 A1* | 10/2012 | Kreil | ......................... | B60P 3/34 296/175 |
| 2013/0106130 A1* | 5/2013 | Yoder | ..................... | F16H 19/04 296/26.02 |
| 2013/0134731 A1* | 5/2013 | Schwindaman | ........... | B60P 3/34 296/26.13 |
| 2013/0269262 A1* | 10/2013 | Siegel | ..................... | B60R 13/08 49/492.1 |
| 2013/0285406 A1 | 10/2013 | Siegel | | |
| 2014/0001710 A1* | 1/2014 | Siegel | ..................... | B60R 13/06 277/630 |
| 2014/0175822 A1* | 6/2014 | Kreil | ......................... | B60P 3/34 296/26.13 |
| 2014/0225333 A1* | 8/2014 | Siegel | ...................... | B60P 3/32 277/630 |
| 2015/0040700 A1* | 2/2015 | Walls | ...................... | F16H 19/04 74/89.17 |
| 2015/0291236 A1* | 10/2015 | Kseizopolski | ............ | F16J 15/50 277/637 |
| 2016/0114715 A1* | 4/2016 | Newhouse | ............. | F16J 15/104 277/642 |
| 2016/0137170 A1* | 5/2016 | Dame | ...................... | B60J 10/00 296/175 |
| 2016/0201893 A1* | 7/2016 | Ksiezopolski | ........ | E04B 1/6803 362/311.02 |
| 2016/0207438 A1* | 7/2016 | Ksiezopolski | ............ | B60P 3/36 |
| 2016/0214524 A1* | 7/2016 | Goode | ...................... | B60P 3/34 |
| 2016/0243973 A1* | 8/2016 | Goode | ...................... | B60P 3/36 |
| 2016/0243974 A1* | 8/2016 | Goode | ...................... | B60P 3/36 |
| 2016/0288689 A1* | 10/2016 | Rodabaugh | ............... | B60P 3/34 |

* cited by examiner

SLIDE-OUT FOR RECREATIONAL VEHICLES

BACKGROUND AND SUMMARY OF THE INVENTION

The present invention relates generally to recreational vehicles, namely motorized and towable vehicles which combine transportation functions with living quarters therein for users to obtain shelter, dine, or sleep for recreation, travel, and camping purposes. More specifically, the present invention relates to slide-out portions of the recreational vehicle which serve to expand the usable space inside the vehicle with the vehicle is not moving, and then contract into the vehicle when it is in motion.

Various prior slide-out constructions are known in the trade. Generally, these slide-out portions are formed as rectangular boxes which are mounted on a track or slide mechanism to control their motion with respect to the vehicle. The track or slide mechanisms are typically mounted to the vehicle and then push or pull the slide-out portion with respect to the vehicle. Typically, a portion of the track or slide mechanism is exposed to the environment and is susceptible to dirt, debris, and the like jamming or interfering with the proper operation of the slide-out. Further, mounting o the slide-out portion on the track or slide mechanism during manufacture is susceptible to misalignment issues either at the outset or later during the useful life of the recreational vehicle. Misaligned motion of the slide-out portion can, for example, damage the interior walls of the vehicle.

Prior slide-out portions typically include an outer wall which overlaps the outer wall of the vehicle when the slide out is closed. Where the vehicle is formed with a non-flat outer wall, that overlap has to accommodate the raised configuration (typically clapboard style ridges) or else it cannot form a weather tight seal at the perimeter of the slide-out. Often this seal is attempted by complex and relatively expensive bulb seal devices. Further, since most slide-out mechanisms are rectangular in configuration, at every square corner the seal often needs to be cut or folded, and that assembly tends to lead to gaps in the weather seal.

Further, prior slide-out mechanisms typically require special reinforcing of the vehicle side wall at the opening where the slide-out potion is to be mounted. Additional reinforcing is often needed for the track or slide mechanisms as well.

Accordingly, it is an object of the present invention to provide an improved slide-out system for use with recreational vehicles. More particularly, the present invention seeks to provide a system that is:
 a. less likely to leak,
 b. less expensive to manufacture and maintain,
 c. reduces vehicle weight,
 d. more reliable in operation over a longer period of time, and
 e. aesthetically pleasing in appearance.

These and other objects of the present invention are obtained by the provision of a slide-out system for recreational vehicles which uses an outer wall which closes flush with the outer wall of the vehicles, radiussed corners about the slide-out periphery, a continuous peripheral seal, a drive mechanism mounted in the slide-out portion rather than on the vehicle, and a drive shaft weather seal. Other objects, advantages and novel features of the present invention will be readily apparent to those skilled in the art from the following drawings and detailed description.

BRIEF DESCRIPTION OF THE DRAWINGS

The background and individual in the drawings form no portion of the claimed design.

DETAILED DESCRIPTION OF THE DRAWINGS

Figure 1:
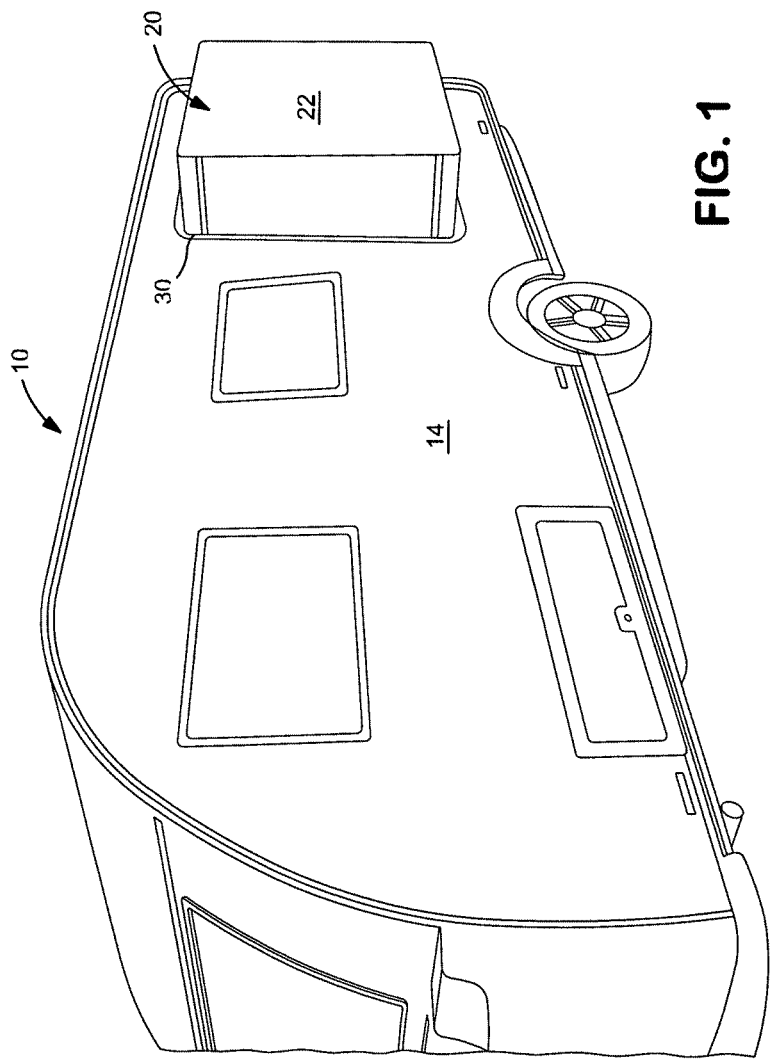
FIG. 1 shows a travel trailer with the slide-out system of the present invention in an open position.
Figure 2:
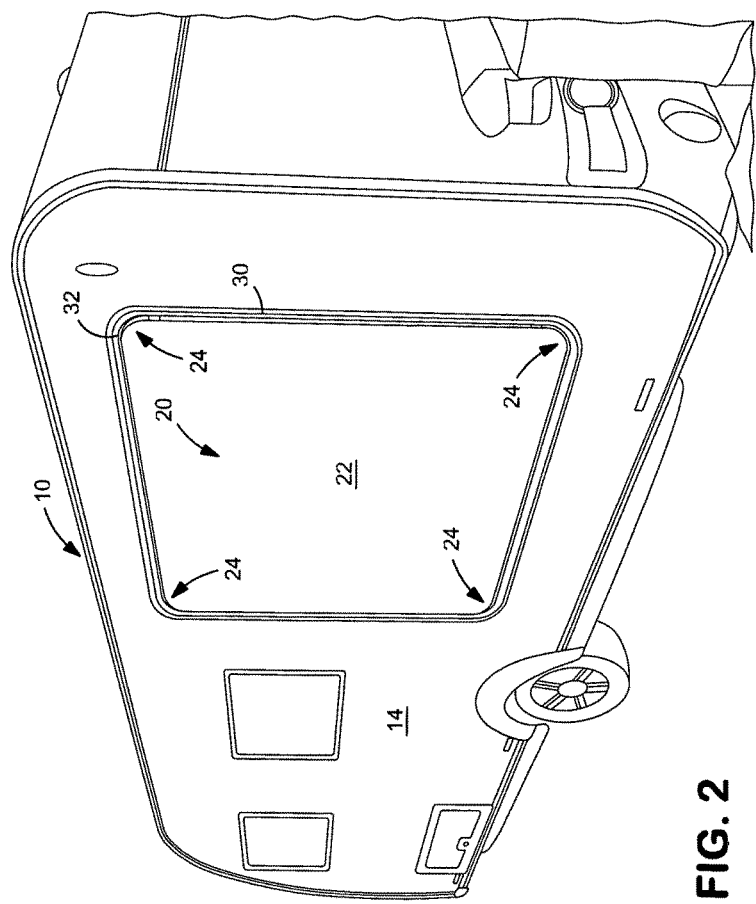
FIG. 2 shows the travel trailer of FIG. 1 with the slide-out system of the present invention in a closed position.
Figure 3:
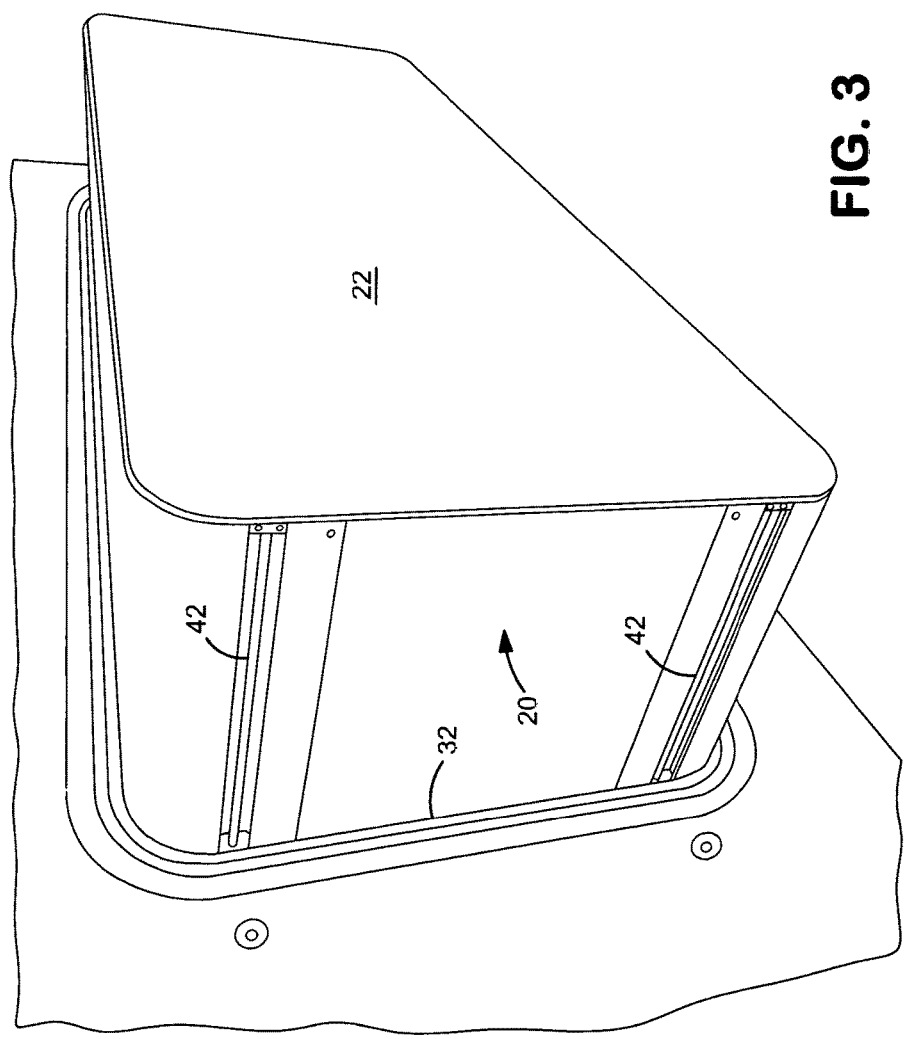
FIG. 3 shows a mock-up portion of the travel trailer of FIG. 1 with the slide-out system in an open position and the weather seal for the drive shaft removed.
Figure 4:
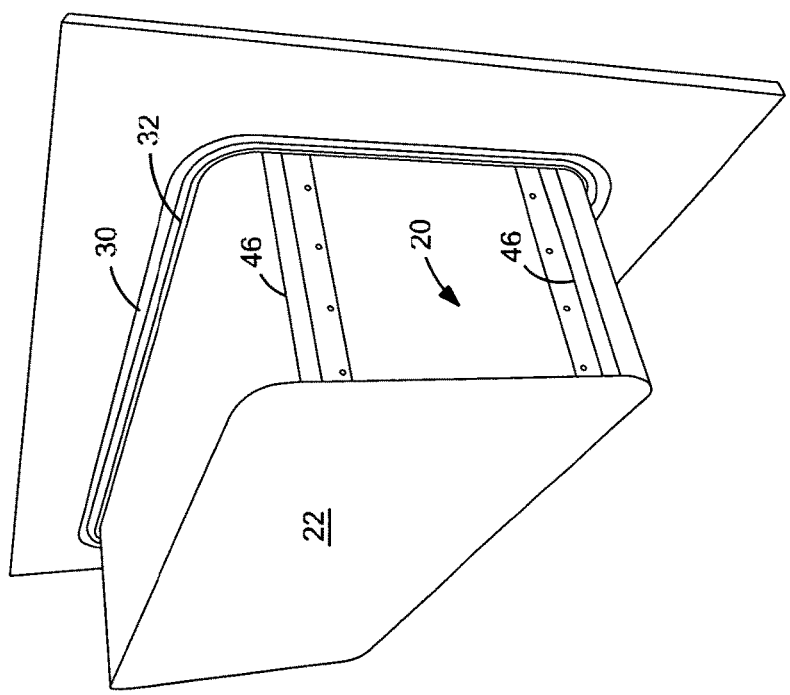
FIG. 4 shows a mock-up portion of the travel trailer of FIG. 1 with the slide-out system in an open position and the weather seal for the drive shaft in place.
Figure 5:
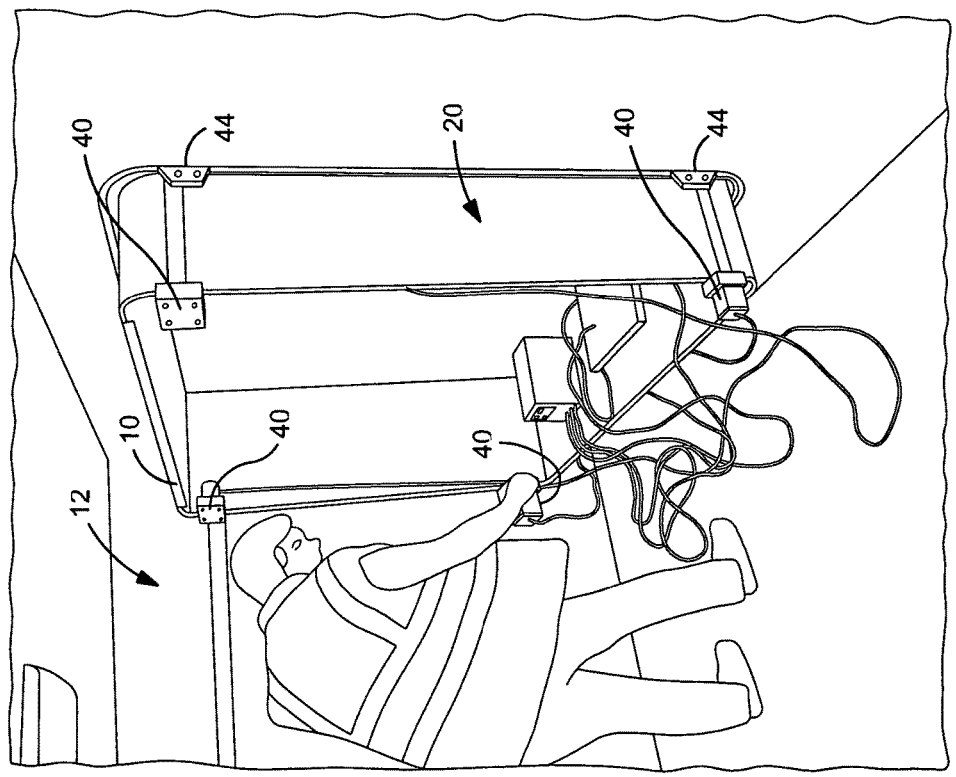
FIG. 5 shows an interior view of the travel trailer of FIG. 1 with the slide-out systems in a closed position and the motive power sources for each drive shaft exposed for view.

FIG. 1 shows a travel trailer 10 type of recreational vehicle. This travel trailers includes an internal compartment 12 to received users and provide a space for shelter, dining, or sleeping. Trailer 10 also includes an outer wall 14 in a generally vertical plane.

A slide-out portion 20 is mounted to trailer 10, and is movable between open and closed positions. In open positions, the slide-out portion increases the usable space of compartment 12. Slide-out portion 20 includes an outer wall 22 in a generally vertical plane. In closed positions of the slide-out portion, outer wall 22 is flush with outer wall 14, meaning that they are in substantially the same vertical plane.

Slide-out portion 20 is contained with a mounting structure having a peripheral frame 30. When assembling the vehicle, once the opening for the slide-out portion is made, the slide-out portion is attached to the vehicle by securing the peripheral frame to the vehicle. Frame 30 includes therein a continuous seal 32, which may be of a conventional nature, which extends along the entire periphery of the slide-out portion. Slide-out portion 20 includes radiussed corners 24. Since seal 32 does not have to travel past any right angle corners, it does not need to be cut and/or overlapped at the corners.

The drive mechanism for moving the slide-out portion in and out of the vehicle includes as its motive power source, for example, four electrical motors 40 mounted in association with each of the radiussed corners. These motors are each connected to cause rotation of threaded drive shafts 42 which are mounted between the motors and brackets 44 connected to frame 30. In order to protect the drive shafts from the environment and to prevent inadvertent contact between users and the drive shafts, the drive shafts are each covered with a flexible weather seal 46. This weather seal can, for example, be formed from two longitudinally extending rubber strips which form an overlap connection from top to bottom adjacent the drive shafts. These strips are flexible enough to allow the bracket connection to separate the strips as the slide-out portion moves past the brackets, but are resilient enough to close that connection once away from the brackets.

It should be noted that a particular feature of this invention is that it allows for an aesthetically pleasing appearance of the slide-out portion in combination with the vehicle.

Although the present invention has been described herein with reference to a particular embodiment, that is only by way of example and illustration. It will be readily understood that the present invention can be applied to a variety of other embodiments. Accordingly, the spirit and scope of this invention are limited only by the terms of the following claims.

What is claimed is:

1. A slide out system for a recreational vehicle, comprising:
   a vehicle with a main body portion having therein a compartment to receive users for purposes of shelter, dining, or sleeping, the vehicle having an outer wall in a generally vertical plane,
   a slide-out portion of the vehicle which is movable onto and out from the main body portion to change the amount of usable space within the compartment,
   the slide-out portion having a floor, a ceiling, an outer wall, and first and second opposed side walls, the outer wall in a generally vertical plane, and
   a mounting structure connecting the slide-out portion to the main body portion, that mounting structure including a peripheral frame fixed to the vehicle and surrounding the floor, ceiling, and side walls of the slide-out portion, and a plurality of drive mechanisms, each of the plurality of drive mechanisms mounted to the slide-out portion and to the peripheral frame.

2. The system according to claim 1 wherein the mounting structure further includes an endless peripheral seal about the floor, ceiling, and first and second opposed side walls of the slide-out portion.

3. The system according to claim 1 wherein the slide-out portion is formed with radiussed corners about its perimeter defined by the floor, ceiling, and first and second opposed side walls.

4. The system according to claim 1 wherein the slide-out portion includes a weather seal protecting a corresponding one of the drive shafts, that weather seal including upper and lower overlapping flexible seal members.

5. The system of claim 1 wherein each of the plurality of drive mechanisms comprises a motive power source mounted on the slide-out portion and a locating bracket mounted on the peripheral frame and fixed with respect to the vehicle.

6. The system of claim 5 wherein each of the plurality of drive mechanisms further comprises a threaded drive shaft connected between the motive power source and the locating bracket for rotation with respect to the motive power source and the locating bracket.

7. The system of claim 5 wherein the motive power source comprises an electric motor.

* * * * *